Feb. 23, 1926.

E. W. MIKAELSON 1,574,048

PIPE CUTTING MACHINE

Filed Feb. 8, 1922 — 11 Sheets-Sheet 6

Inventor.
Erik W. Mikaelson
by J. H. McCrady
his Atty.

Feb. 23, 1926.                                                      1,574,048
            E. W. MIKAELSON
            PIPE CUTTING MACHINE
        Filed Feb. 8, 1922         11 Sheets-Sheet 9

Inventor.
Erik W. Mikaelson
by J. H. McCready
his Atty.

Feb. 23, 1926.  1,574,048
E. W. MIKAELSON
PIPE CUTTING MACHINE
Filed Feb. 8, 1922    11 Sheets-Sheet 10

Inventor.
Erik W. Mikaelson
by J. H. McCrady
his Atty.

Feb. 23, 1926.

E. W. MIKAELSON

PIPE CUTTING MACHINE 1,574,048

Filed Feb. 8, 1922     11 Sheets-Sheet 11

Inventor.
Erik W. Mikaelson
by J. H. McCrady
His Atty.

Patented Feb. 23, 1926.

1,574,048

UNITED STATES PATENT OFFICE.

ERIK W. MIKAELSON, OF EASTON, PENNSYLVANIA, ASSIGNOR TO TREADWELL ENGINEERING COMPANY, OF EASTON, PENNSYLVANIA, A CORPORATION OF PENNSYLVANIA.

PIPE-CUTTING MACHINE.

Application filed February 8, 1922. Serial No. 534,909.

*To all whom it may concern:*

Be it known that I, ERIK W. MIKAELSON, a citizen of the United States, residing at Easton, in the county of Northampton and State of Pennsylvania, have invented certain new and useful Improvements in Pipe-Cutting Machines, of which the following is a specification.

This invention relates to machines for cutting pipe, tubing, shafting, rods, and the like, hereinafter for convenience referred to as "pipe", and is especially concerned with machines of this type used in mills in which the pipe is made. After a length of pipe has been welded, it is necessary to cut off the ends, both for the purpose of trimming off the rough end portions left by the welding operation, and also to cut the pipe to the required length. It has been customary heretofore to perform this operation in a machine provided with a turret or table which supports and holds the pipe and presents first one end and then the other to a mechanism that cuts off the ends. This type of machine, while widely used, occupies considerable floor space, and it is also open to the objection that it is relatively slow, since it cuts off one end only of the pipe at a time.

The present invention has for its chief object to devise a pipe cutting machine which will be faster in operation than the machines heretofore proposed for this purpose, which will occupy less floor space, in which pipe can be handled more readily and economically, and which generally will be an improvement on prior machines of this character.

The nature of the invention will be readily understood from the following description when read in connection with the accompanying drawings, and the novel features will be particularly pointed out in the appended claims.

Referring now to the drawings.

Preliminary to a detailed description of the construction and operation of the machine shown, it may be stated that the machine comprises a pair of chucks in which the pipe is gripped near its opposite ends and by means of which it is rotated. While the pipe is being revolved, cutting tools are brought into operation which simultaneously cut off the opposite end portions of the pipe. A feeding mechanism automatically delivers the lengths of pipe one at a time to the chucks, and mechanism also is provided for ejecting each length of pipe from the machine as soon as the cutting-off operation has been completed. The detailed description of the several mechanisms of the machine will be taken up in substantially the order in which they have just been mentioned.

Figure 1:
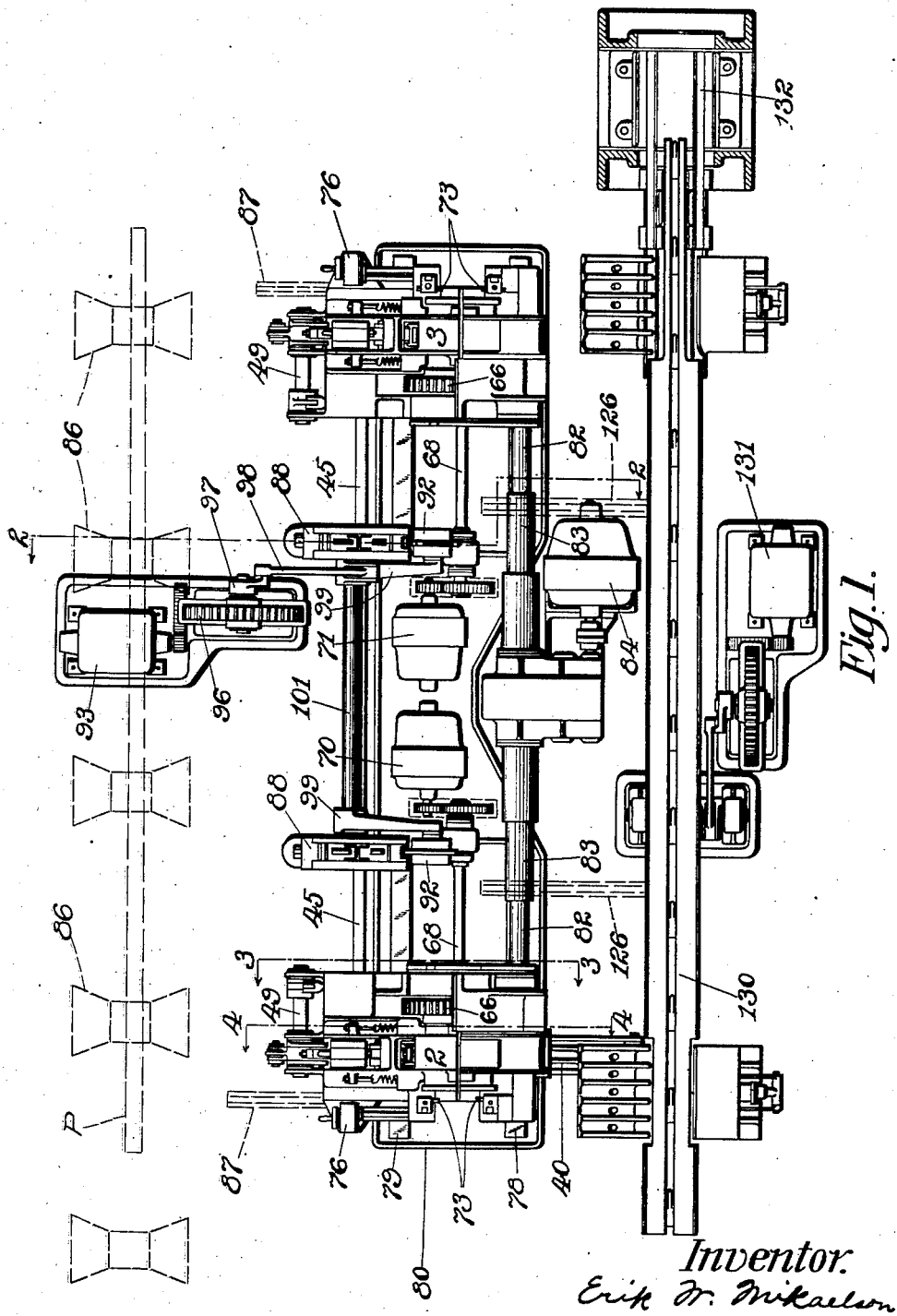
Figure 1 is a plan view of a machine embodying the invention in the form at present preferred.
Figure 5:
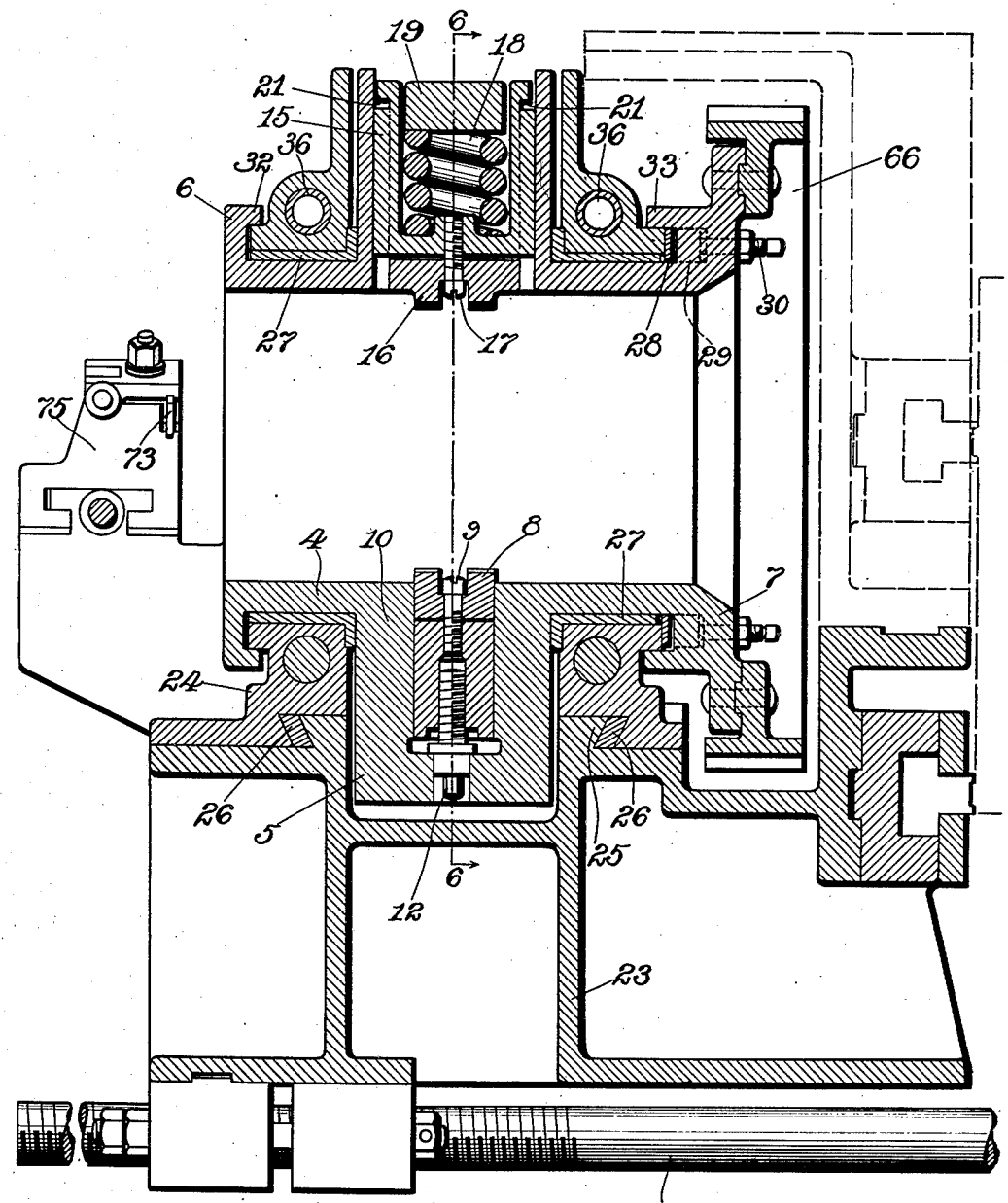
Fig. 5 is a longitudinal cross sectional view of one of the chucks or holders for supporting the pipe while its ends are being severed.
Figure 6:
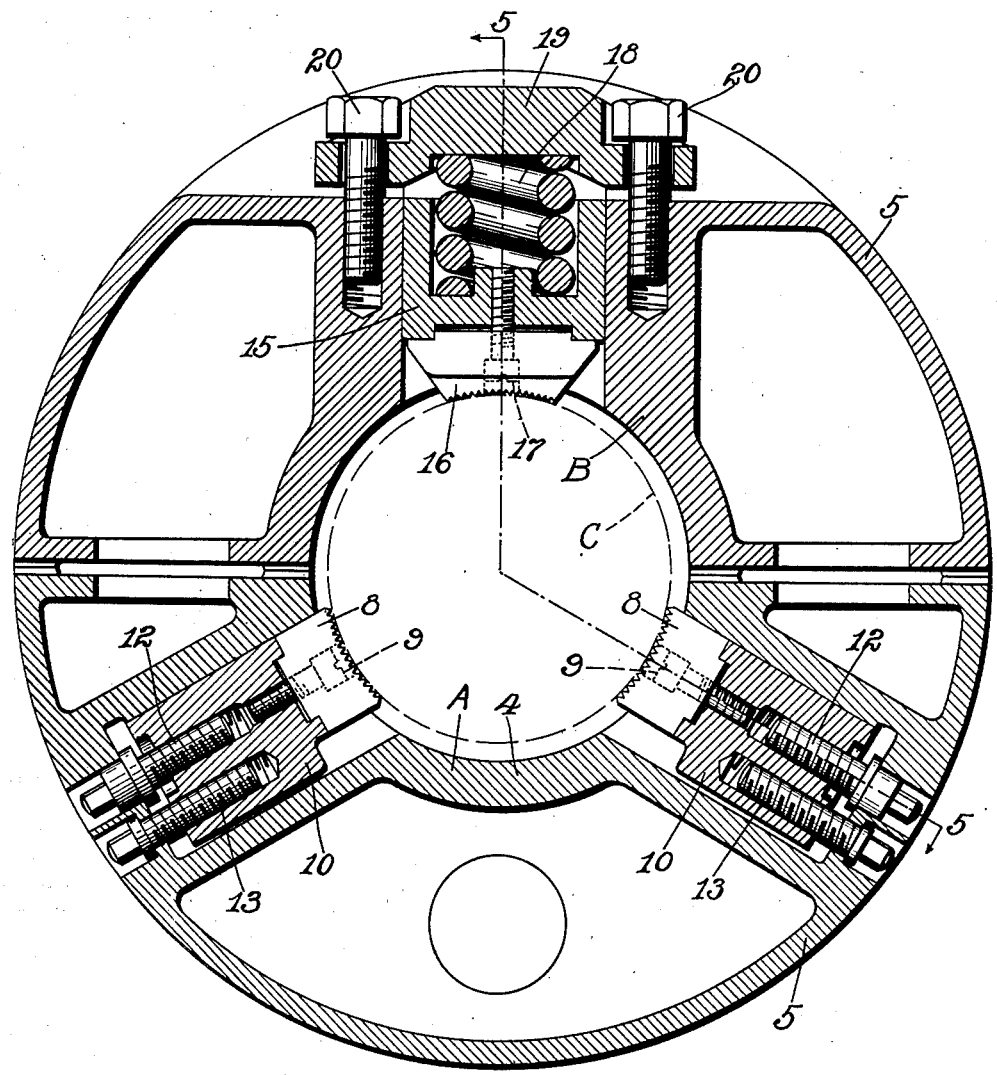
Fig. 6 is a cross sectional view on the line 6—6, Fig. 5.

Referring first to Fig. 1, the machine shown comprises two work supporting heads, indicated in general at 2 and 3, respectively, mounted for adjustment toward and from each other. The construction of one head is exactly like that of the other, except that one is a right-hand while the other is a left-hand head. Consequently a detailed description of one head only will be given. The left-hand head 2 is clearly shown in Figs. 4 to 7, from which it will be seen that the head comprises a chuck that consists of a body 4 having the general form of a cylinder but provided with a central annular enlargement 5 and with flanged ends 6 and 7. The chuck is split longitudinally on a plane extending through its axis and is thus divided into two sections indicated at A and B, Fig. 6. The section A is provided with two jaws 8—8, each having toothed pipe engaging faces and being secured by screws 9—9 to slides 10—10 which are mounted in sockets formed in the part A. The adjustment of these slides toward and from the axis of the chuck is made by means of opposed bolts or screws 12 and 13. The other section B of the chuck has a slide 15 mounted therein to move toward and from the axis of the chuck and this slide carries a jaw 16 removably secured to the slide by screws 17. A heavy coiled spring 18 forces the slide 15 inwardly, this spring being backed up by a cap 19 which is secured to the part B by bolts 20—20. The guideway in which the slide 15 moves is grooved, as indicated by dotted lines in Fig. 5, and the upper end of the slide is provided with shoulders 21—21 which engage the outer ends of the walls of the guideway and limit the inward movement of the slide. As shown in Fig. 6, the three jaws 8—8 and 16 are spaced apart at angles of 120° from each other so that they will bear evenly on the outer surface of a pipe placed in the chuck, as indicated by the dotted circle C in said figure. When pipes of substantially smaller diameter are to be operated upon, the jaws 8—8 and 16 can be replaced by other parts of the proper shapes and dimensions.

Figure 4:
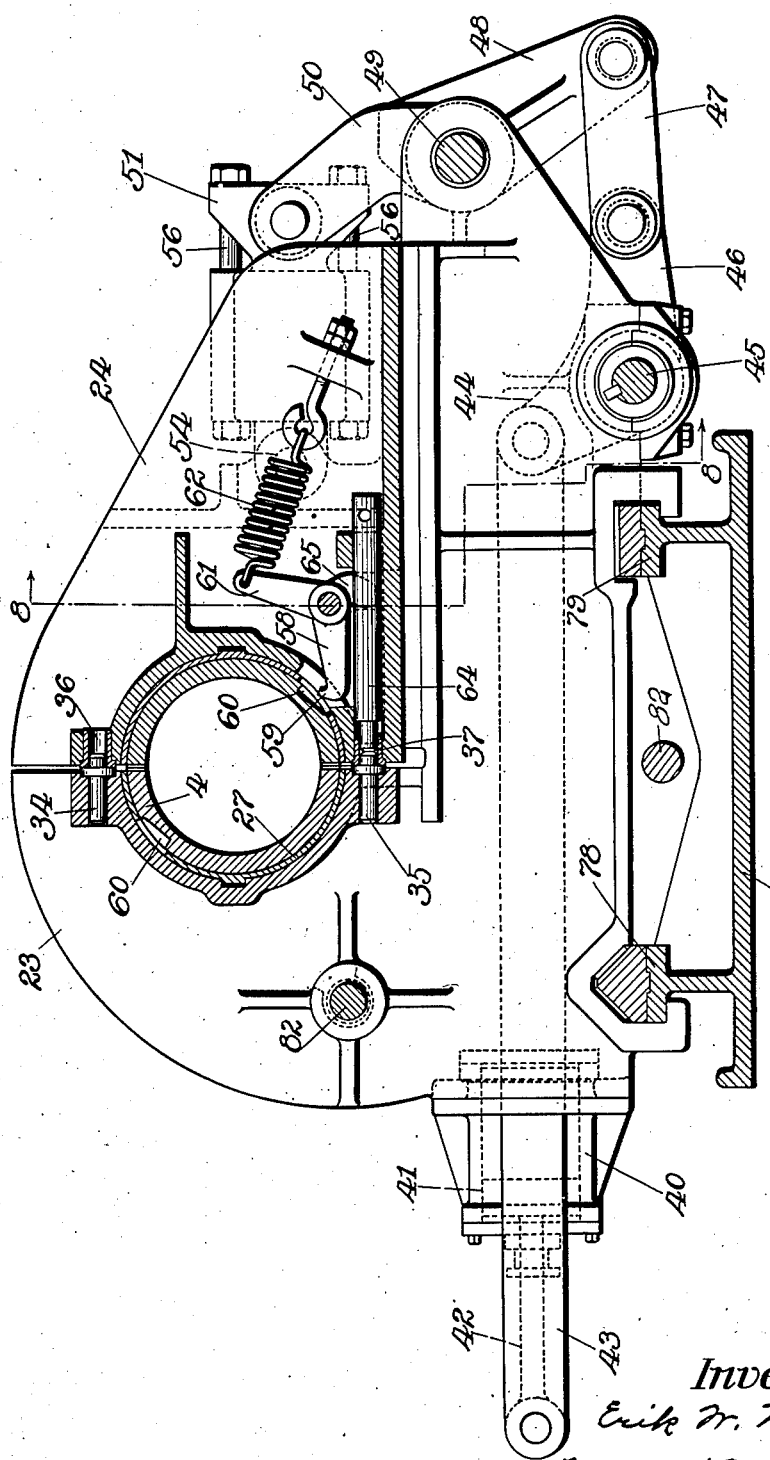
Fig. 4 is a cross sectional view on the line 4—4, Fig. 1.
Figure 9:
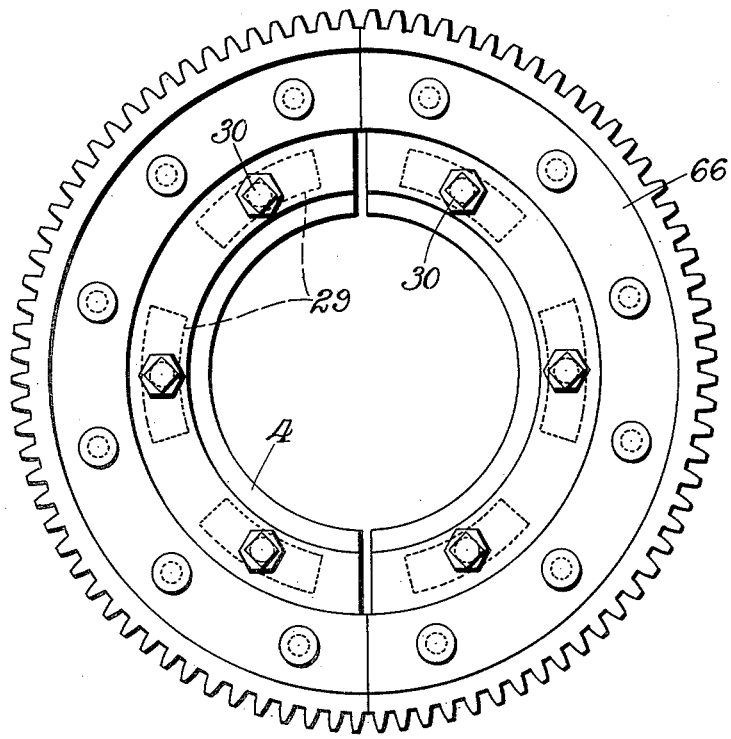
Fig. 9 is a side elevation of one of the gears used to drive the chuck or work holder.

The chuck 4 is mounted in a split bearing which includes a heavy bracket or frame member 23, Fig. 4, and another member 24 mounted to slide in a guideway formed in the part 23. Fig. 5 shows the latter part provided with a dove-tail piece 25 and the part 24 with a groove similarly shaped, wear pieces 26—26 being interposed between these parts. When the parts are in the relationship shown in Fig. 4, the brackets 23 and 24 form, in effect, a solid bearing for the chuck. At the same time, this construction enables the two bearing members to be relatively moved to open the chuck to receive or eject the work. The bearing members are provided with bearing linings or bushings 27 in which the body 4 of the chuck runs, and additional linings or wear strips 28 and 29 are interposed between the flange 7 and the end of the bearing member 24, as best shown in Figs. 5 and 9, the wear pieces 29 being backed up by bolts 30 so that they may be adjusted to take up any wear between these parts and also to limit the end play of the chuck relatively to the bearings. It will be seen from an inspection of Fig. 5 that the flanged ends 6 and 7 are provided with backwardly extending tips 32 and 33, respectively, which overlap or embrace portions of the bearing parts 23 and 24 and retain the two halves of the chuck in their normal relationship to their respective bearing members when the chuck is opened.

For the purpose of compelling the two parts 23 and 24 of the bearing to register with each other when these parts are in their normal relationship, the part 23 carries two pairs of pins 34 and 35, Figs. 4 and 5, adapted to enter bushed holes 36 and 37, respectively, in the slidable bracket 24.

Figure 7:
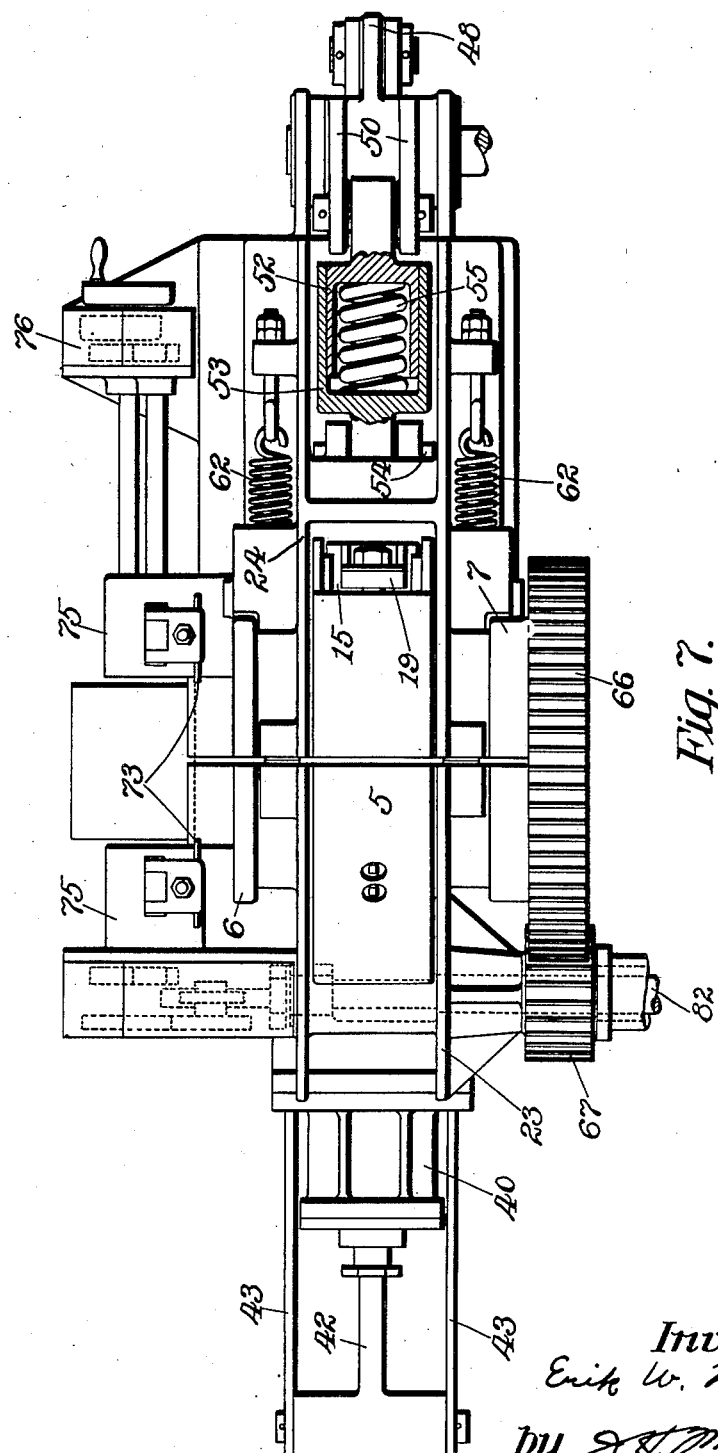
Fig. 7 is a plan view of the mechanism shown in Fig. 4, certain parts, however, being cut away.

The mechanism for opening and closing the chuck comprises an air cylinder 40, Figs. 4 and 7, having a piston 41 therein which is connected to a piston rod 42. A double link 43 connects the piston with one arm 44 of a bell crank lever splined on the rock shaft 45, and the other arm 46 of this lever is connected by a link 47 to an arm 48 of another bell crank lever fast on the rock shaft 49. The latter lever has a second arm 50 which is pivoted to a yoke 51 having a tubular part 52, Fig. 7, that telescopes within a similar part 53 of another member which is connected by a pivot pin 54 to the slidable bracket 24. A coiled spring 55 is interposed between the parts 52 and 53, these two parts forming a housing for the spring, and the separating movement of these parts produced by the spring is limited by bolts 56—56, Fig. 4.

When air is admitted to the cylinder 40 the resultant movement of the piston 41 is transmitted through the connections just described, swinging the lever arm 46 in a clockwise direction and thus sliding the bracket 24, and the parts carried thereby, backwardly toward the right, Fig. 4. The reverse movement of the piston returns the slide 24 again to its original position, as shown in Fig. 4, this movement, however, being yieldingly transmitted to the slide through the spring 55. It should be noted that this spring is relatively powerful and that the parts 46 and 47 and their pivots constitute a toggle which is moved into its dead center position in closing the chuck. This toggle, therefore, acts to lock the chuck in its closed position.

Figure 8:
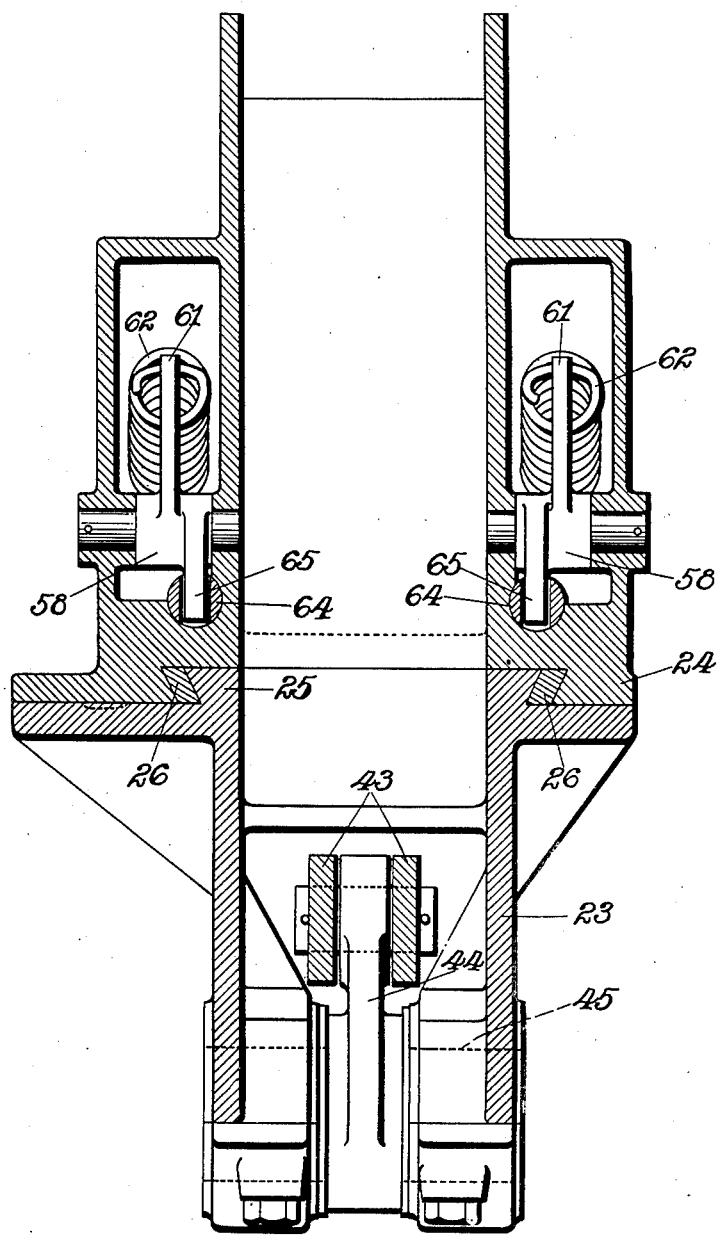
Fig. 8 is a cross sectional view on the line 8—8, Fig. 4.

When the chuck is opened in the manner just described, the left-hand section, Fig. 4, of the chuck, is held against rotation through its connections (later to be described) with the driving mechanism for the chuck. In order to hold the right-hand section in the proper angular relationship to the bearing 24, a pair of dogs 58 is provided (see Figs. 4, 7 and 8). Each dog has a toe 59, Fig. 4, adapted to enter either one of two notches 60—60 formed at diametrically opposite points in the part 4, and it is also provided with an arm 61 which is acted upon by a spring 62 anchored to the part 24. When the slide 24 moves into its open position the spring 62 swings the dogs 58 into their operative positions, thus entering the points 59 in the notches 60. When the slide is returned to its original position, as shown in Fig. 4, each dog is moved into its inoperative position again through the engagement of a bolt 64 with the pin 35, this bolt having a socket therein to receive a tail piece 65 projecting downwardly from the dog 58.

The rock shaft 45 extends substantially the entire length of the machine, as shown in Fig. 1, so that it rigidly connects both the chuck opening and closing mechanisms. These mechanisms, therefore, operate simultaneously and a single air cylinder only is required to operate both of them.

The driving mechanism for the chuck comprises a gear 66 which is split, as clearly shown in Fig. 9, the two halves being bolted to the respective sections A and B of the chuck. A pinion 67, Fig. 7, fast on telescoping shafts 82 and 83 drives the gear 66, this telescoping shaft being driven through suitable gear connections with a motor 84, Fig. 1. Additional telescoping shafts 82 and 83 operate through similar connections with the gear 66 of the head 3. The motor 84 preferably will be operated through a limit switch and magnetic breaking mechanism which will cause the chucks to make a certain number of revolutions and then stop automatically, the brake stopping each chuck in substantially the position shown in Fig. 4, in readiness to be opened immediately to release the pipe. Such switch and brake mechanisms are well known in the art and any illustration of them, therefore, is believed to be unnecessary.

It will now be understood that the pipe to be operated upon is gripped near its opposite ends in the two heads 2 and 3, and is rapidly revolved by power transmitted to the chucks from the motor 84, both chucks being driven by the same motor. While the pipe is so rotated, cutting-off tools 73—73 are fed inwardly against the pipe and cut off the projecting ends, both ends being severed substantially simultaneously. The cutting-off tools may conveniently be supported in tool heads 75—75, Figs. 5 and 7, of known construction, these heads being mounted on suitable brackets supported on the bearing frame piece 23, and they may be equipped with any convenient feeding mechanism for advancing and retracting the tools.

Figure 11:
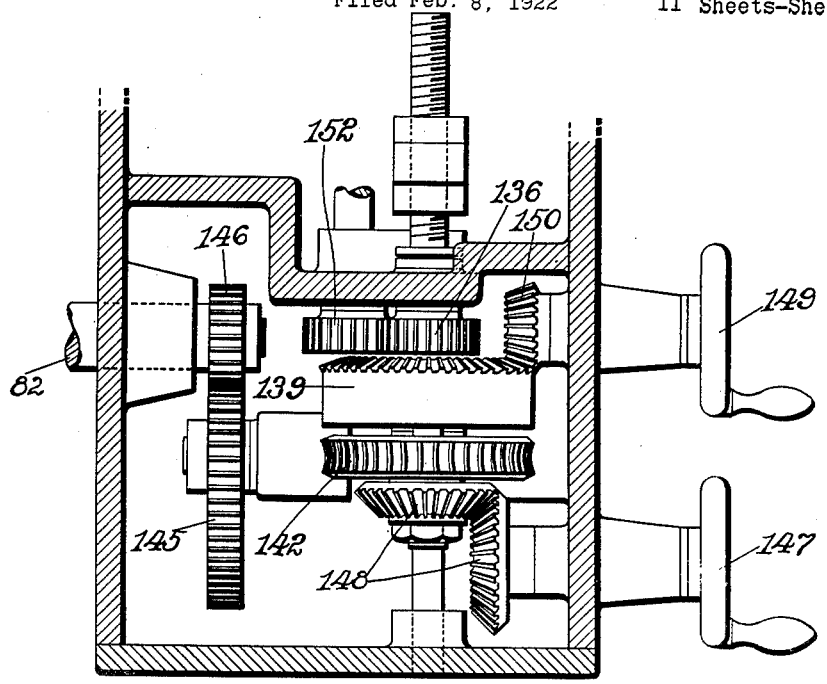
Fig. 11 is a plan view of the tool supporting and feeding mechanism.
Figure 12:
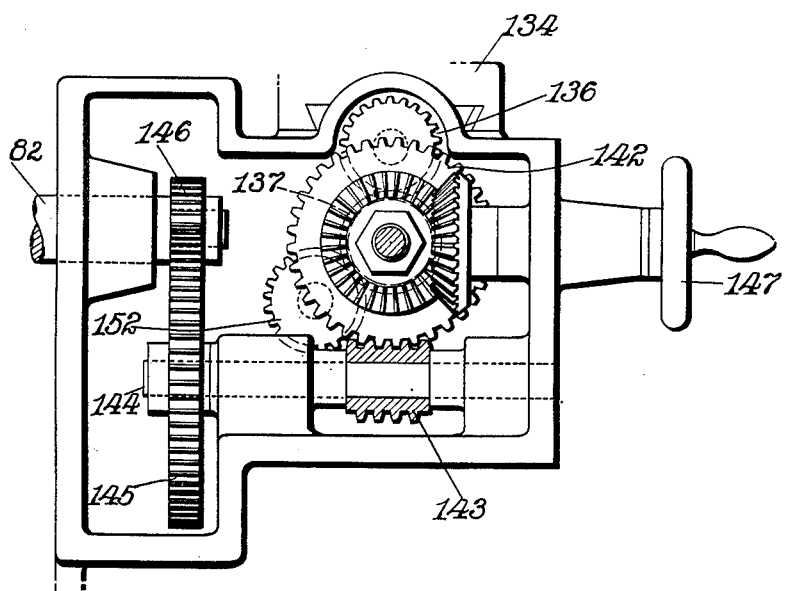
Fig. 12 is a side elevation of the mechanism shown in Fig. 11.
Figure 13:
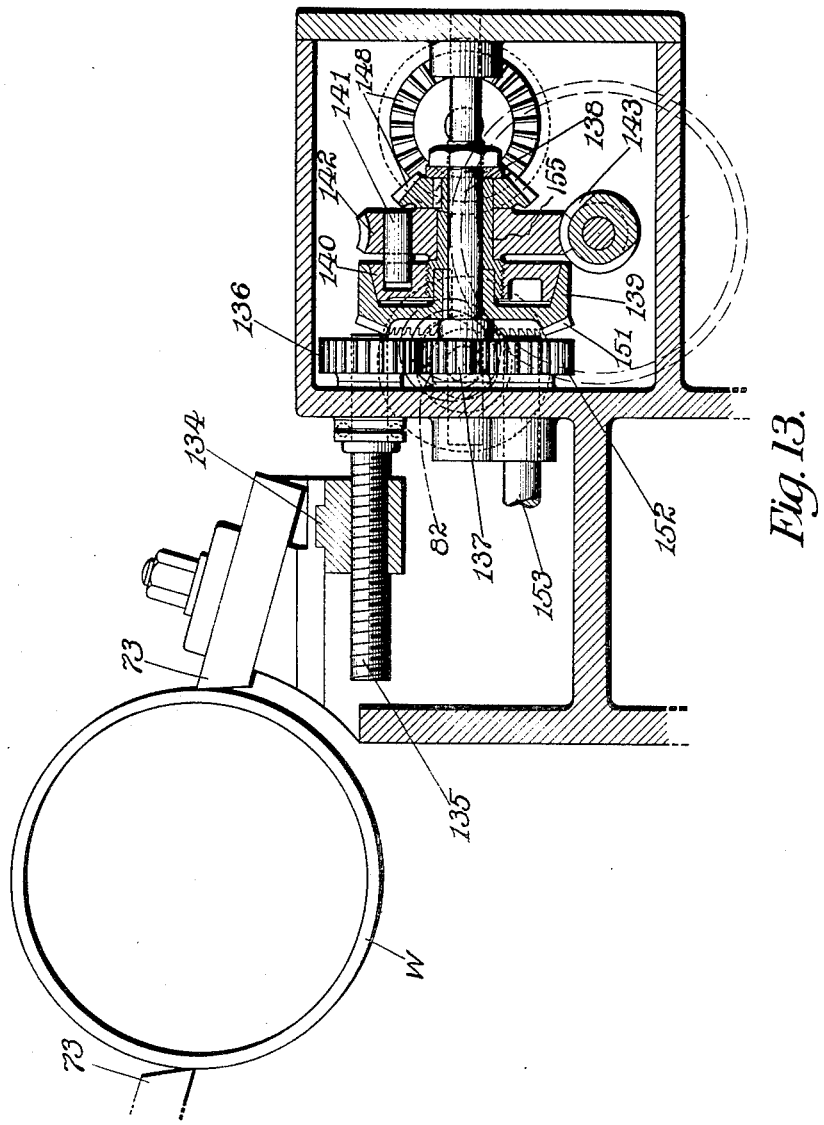
Fig. 13 is a vertical cross sectional view of the mechanisms shown in Figs. 11 and 12.

A supporting and feeding mechanism for the cutting-off tools which may conveniently be used with this machine, but which is slightly different from that shown in Figs. 1 and 5, is illustrated in Figs. 11, 12 and 13. In this construction the right-hand cutting-off tool 73, Fig. 13 is supported in a tool holder slide 134 operated by a lead screw 135. This screw has a gear 136 fast on its inner end which is driven by another gear 137 fast on the shaft 138 to which also is fixed one member 139 of a friction clutch. The other member 140 of this clutch is connected by a pin 141 with a worm wheel 142 that is driven by a worm 143 fast on a shaft 144. This shaft carries a gear 145 driven by a pinion 146 fast on the end of the shaft 82 which drives the chuck. A hand wheel 147 is connected through bevel gears 148 with the sleeve 155 on which the parts 140 and 142 are mounted, and the sleeve has a threaded engagement with the clutch part 140, as shown in Fig. 13, so that by turning this hand wheel the clutch member 140 may be engaged with or disengaged from its cooperating clutch part 139. The tool 73 may then be advanced or retracted manually through the operation of the hand wheel 149 which rotates a pinion 150 that meshes with a bevel gear 151 integral with the part 139. A gear 152 meshing with the gear 138 is secured on a shaft 153 that extends through to the other tool supporting mechanism and operates the left-hand cutting tool 73, Fig. 13, through connections similar to those between the gear 152 and the right-hand cutter 73. This tool operating mechanism advances the cutters into engagement with the pipe W and automatically feeds the cutters far enough to sever the pipe, after which the direction of rotation is reversed and the tools are returned again to their initial positions. With this arrangement a single mechanism controls both the rotation of the chucks and the feeding of the tools, since both are operated from the motor 84 which drives the shaft 82—82.

It is desirable to be able to adjust the work supporting heads toward and from each other to cut different lengths of pipe, or rather to cut the pipes to the different standard lengths usual in the trade. For this purpose the bearing or frame pieces 23 of the two heads are mounted on rails or guides 78—79, Figs. 1, 3 and 4, formed on a bed 80. Two lead screws 68—68 are threaded in the lower portions of the two castings 23—23 which are driven by gear connections with electric motors 70—71. Consequently, the operation of the motor will move the heads 2 and 3 toward or from each other, depending on the direction in which the motors are driven. The shafts 82—82 have splined connections with the respective pinions 67 which they drive, and the shaft 45 has a splined connection with the parts that it operates, so that the adjustment of the heads does not interfere with the operation of the parts connected with these shafts.

The lengths of pipe to be cut are run from the welding apparatus on to a transfer table usually equipped with rolls, such as those indicated at 86, Fig. 1, one such length of pipe being indicated in dotted lines at P. These lengths of pipe are transferred in any convenient manner to inclined skids 87—87, and the pipes roll down these skids to the machine. The machine includes an automatic mechanism for separating the pipes so that only one pipe will be delivered to the machine at a time, and automatic means for effecting the delivery of a selected pipe to the chucks.

Figure 2:
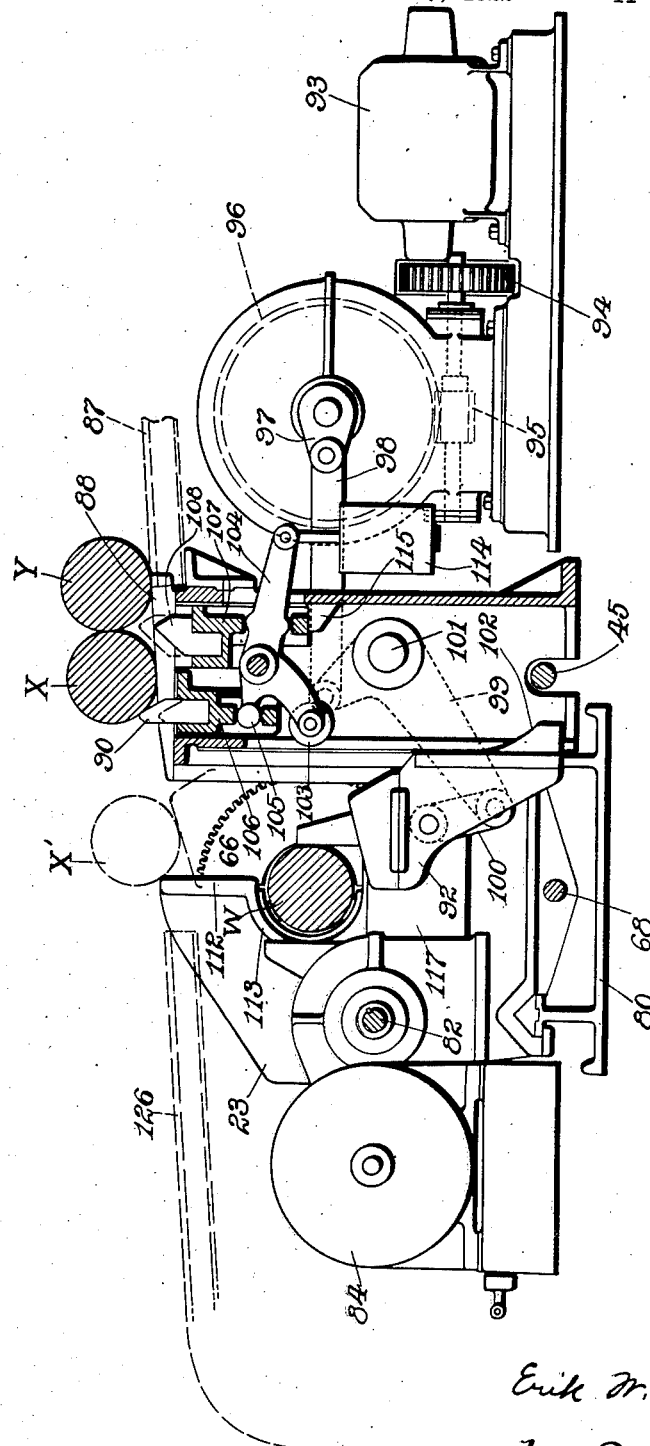
Fig. 2 is a cross sectional view on the line 2—2, Fig. 1.

As the pipes roll down the skids 87—87 they run on to supports 88—88, Fig. 1, having the same inclination as, and located in the plane of, the skids. Referring to Fig. 2, it will be seen that the foremost of the pipes X is stopped by a dog or stop 90 with the next adjacent pipe Y resting against the pipe X. The foremost pipe in the row is lowered into position to be carried into the chucks by an elevator 92 having an upper inclined face, as clearly shown in Fig. 2. This elevator consists of a slide mounted in a vertical guideway formed in the machine frame and arranged to be moved up and down by connections with a motor 92. These connections comprise gearing 94 driving a worm 95 which, in turn, drives a worm wheel 96. A crank 97 driven by this worm wheel is connected by a link 98 to one arm of a bell crank lever 99, the other arm of which is connected through a link 100 to the elevator 92.

Fig. 2 shows the elevator in its lowermost position and it moves from this position into one somewhat higher than that indicated by dotted lines in said figure. As the elevator rises into the latter position a cam face 102 formed thereon engages a roll 103 carried by a bell crank lever 104 and rocks this lever in a counter-clockwise direction. This movement operates through a ball end 105, with which the lever is provided, to depress the slide 106 in which the dog or stop 90 is mounted. At the same time it raises another slide 107 carrying a dog or stop 108 into position to stop any forward movement of the pipe Y. The depression of the dog 90, however, allows the pipe X to roll forward until it strikes against the rearward surface of the elevator. As the elevator moves downwardly again the pipe X rolls forward on to the inclined surface of the elevator into the position shown at X', Fig. 2, where it is stopped by a vertical wall 112 formed on a part of the casting 23. As the elevator continues to move downwardly, the pipe X moves with it until it reaches the cut-out portion 113 in the casting, when the pipe is moved forward into the open section of the chuck.

Two elevating and separating units of the character shown in Fig. 2 are provided, as indicated in Fig. 1, both units operating in unison by virtue of the fact that the bell crank levers 99 of the two units are both splined on a common rock shaft 101.

The motor 93 which operates the feeding and separating mechanism preferably is controlled through a limit switch which automatically stops the elevator at the desired point.

As the elevator 92 is lowered and the cam 102 moves out of contact with the roll 103, a weight 114, Fig. 2, connected to the rearward end of the lever 104, returns this lever to its original position, as shown in Fig. 2, thus depressing the dog 108 and elevating the dog 90. The pipe Y thereupon rolls forward until it strikes the dog 90, thus taking the place of the pipe X which has just been delivered to the chucks. A stop 115 arranged to engage the lower end of the slide 107 limits the movement of the bell crank lever 104 which is produced by the weight 114.

Figure 3:
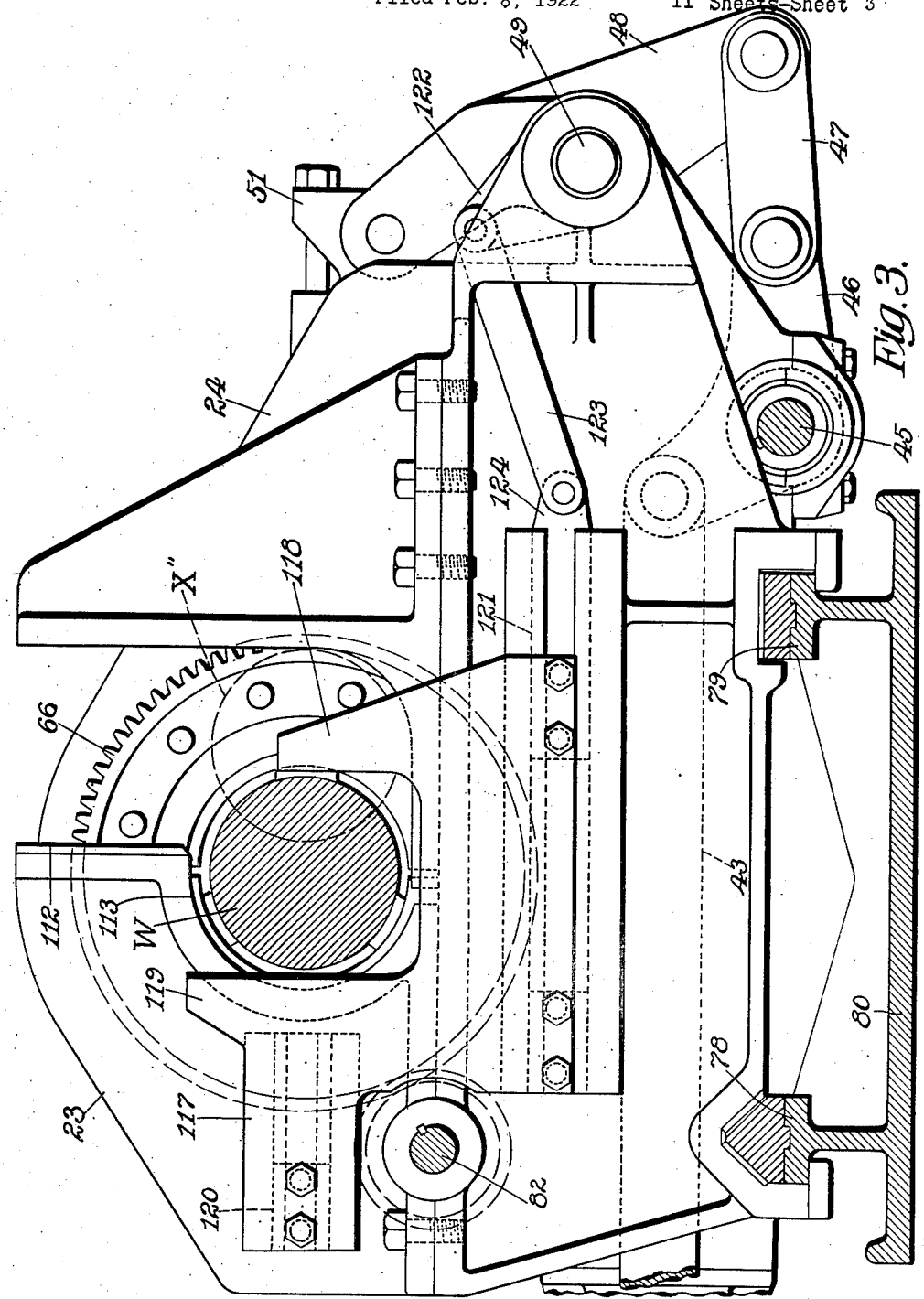
Fig. 3 is a cross sectional view on the line 3—3, Fig. 1.

In order to ensure the correct positioning of the pipe in the chucks, a U-shaped carrier 117, Fig. 3, is associated with each chuck. This carrier has right and left arms 118 and 119, respectively, between which the pipe is lowered into the position indicated at X'', Fig. 3, in the manner above described. The carrier is mounted to slide in guideways 120 and 121, and it is moved backward and forward by connections with the rock shaft 49, previously referred to, these connections comprising an arm 122 fast on said rock shaft and a link 123 connecting said arm with a part 124 rigid with the carrier 117. The rock shaft 49, as above described, is rocked in a clockwise direction, Fig. 3, to open the chucks, and in the opposite direction to close the chucks again. The pipe is lowered into a position between the arms 118 and 119 while the chuck is open, and the carrier is next moved toward the left, Fig. 3, as the chuck closes, the arm 118 forcing the pipe firmly into the open section of the chuck as indicated at W, Figs. 2 and 3. This carrier, therefore, assists in properly placing the pipe in the chuck.

After the ends of the pipe have been cut off, it still is in the position shown at W, Fig. 3, and as the chuck opens, the arm 119 of the carrier 117 engages the pipe and ejects it or carries it out of the chuck into the position indicated at X'', Fig. 3. In this position the right-hand face of the arm 119 forms a continuation of the guiding wall 112 so that as the elevator 92 rises, it carries this pipe up past the upper edge of the wall 112, and it then rolls over the top of this wall on to discharge skids 126, Figs. 1 and 2, which carry it away from the machine. It will thus be observed that the pipe is introduced laterally or in other words, in a radial direction into the chucks, as distinguished from being introduced endwise or axially of the chucks. Also, that the pipe is ejected radially or laterally with reference to the chucks. This arrangement facilitates the handling of the pipe, and is very economical of time.

Figure 10:
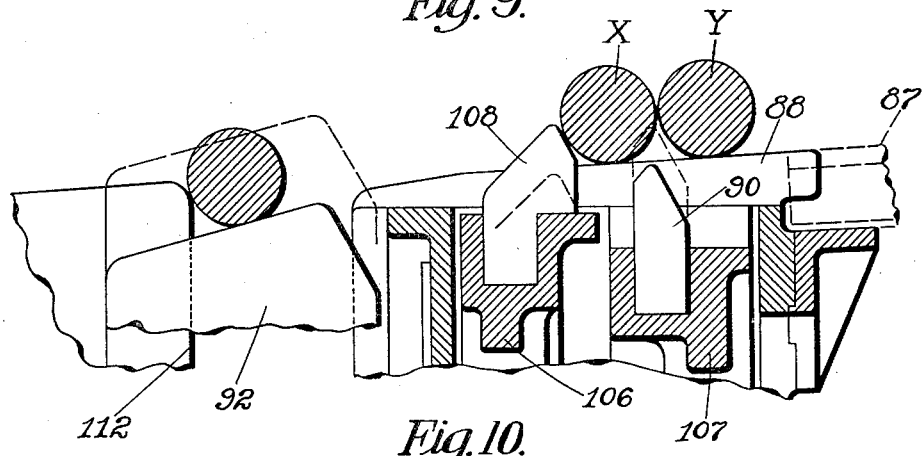
Fig. 10 is a cross sectional view showing a modified form of apparatus for controlling the delivery of the pipes to the machine.

When substantially smaller sizes of pipe are to be handled, the separating mechanism shown in Fig. 2 may be modified by interchanging the dogs 90 and 108, as shown in Fig. 10. The operation of this mechanism, as so modified, will be obvious from the foregoing description.

The cut-off ends of pipe are conducted by suitable aprons or chutes to a conveyor 130, Fig. 1, operated by a motor 131 which carries them to a press 132.

It will now be appreciated that this invention provides a machine which will operate very rapidly, which occupies relatively little floor space, which can readily be adjusted for different lengths of pipe, and which requires a minimum of attention.

While the operation performed by the machine has been described as that of cutting off the ends of pipe, since this is a very important use of the machine, it will readily be appreciated that the cutting off tools can be replaced by threading tools and the machine used for the threading of the ends of the pipe. It is contemplated also that other operations than cutting off and threading can be performed in the machine through the use of suitable tools. It will further be understood that the invention can be used with equal facility in the cutting off or machining of the ends of shafting, rods, tubing, and the like, and that the term "pipe" as used herein is intended to include other articles of work which the machine is adapted to handle.

While I have herein shown and described the best embodiment of the invention of which I am at present aware, it is contemplated that this embodiment may be modified in many particulars without departing from the spirit or scope of this invention.

Having thus described my invention, what I desire to claim as new is:

1. A pipe cutting machine comprising, in combination, tools for simultaneously cutting off opposite ends of a length of pipe, means for holding a length of pipe for said cutting operation, mechanism for presenting lengths of pipe one at a time to said holding means, mechanism for ejecting the lengths of pipe from said holding means after the ends of the pipe have been cut off, and automatic means for relatively moving said tools and said holding means to effect said cutting operation.

2. A pipe cutting machine comprising, in combination, means for simultaneously cutting off opposite ends of a length of pipe, mechanism for holding and rotating the pipe while its ends are cut off by said means, and automatic mechanism for delivering lengths of pipe one at a time to said mechanism.

3. A pipe cutting machine comprising, in combination, means for simultaneously cutting off opposite ends of a length of pipe, mechanism for holding and rotating the pipe while its ends are cut off by said means, and mechanism for automatically ejecting the pipe from said holding mechanism after said ends have been cut off.

4. A pipe cutting machine comprising, in combination, means for simultaneously cutting off opposite ends of a length of pipe, mechanism for holding the pipe while the ends are cut off by said means, automatic mechanism for delivering lengths of pipe one at a time to said holding mechanism, and mechanism for ejecting the lengths of pipe from said holding mechanism after their ends have been cut off.

5. In a machine of the character described, the combination of a pair of chucks spaced apart and operative to grip a pipe near opposite ends thereof, automatic mechanism for opening and closing said chucks to cause them to grip or release the pipe, and mechanism for supporting and rotating said chucks.

6. In a machine of the character described, the combination of a pair of chucks spaced apart to grip a pipe near opposite ends thereof, each of said chucks being constructed to open laterally to receive or discharge a pipe, mechanism for rotating said chucks in unison, and supporting means for said chucks enabling them to be adjusted toward or from each other.

7. In a machine of the character described, the combination of a pair of chucks spaced apart to grip a pipe near opposite ends thereof, each of said chucks being constructed to open laterally to receive or discharge a pipe, mechanism for rotating said chucks in unison, and power driven mechanism for adjusting said chucks toward or from each other.

8. In a machine of the character described, the combination of a pair of chucks spaced apart to grip a pipe near opposite ends thereof, each of said chucks being constructed to open laterally to receive or discharge a pipe, mechanism for rotating said chucks in unison, tools for acting on the pipe while it is rotated by said chucks, and operating mechanism for said tools.

9. In a machine of the character described, the combination of a pair of chucks spaced apart to grip a pipe near opposite ends thereof, each of said chucks being constructed to open laterally to receive or discharge a pipe, mechanism for rotating said chucks in unison, cutting or tools arranged to act on said pipe near opposite ends thereof while it is being rotated by said chucks, and automatic feeding mechanism for said tools.

10. In a machine of the character described, the combination of a pair of chucks spaced apart to grip a pipe near opposite ends thereof, each of said chucks being constructed to open laterally to receive or discharge a pipe, mechanism for rotating said chucks in unison, cutting off tools arranged to act on said pipe near opposite ends thereof while it is being rotated by said chucks, and automatic feeding mechanism for said tools driven from said chuck rotating mechanism.

11. In a machine of the character described, the combination of a pair of chucks spaced apart to grip a pipe near opposite ends thereof, each of said chucks being constructed to open laterally to receive or discharge a pipe, mechanism for rotating said chucks in unison, tools for acting on the pipe while it is rotated by said chucks, operating mechanism for said tools, and mechanism for opening and closing said chucks.

12. In a machine of the character described, the combination of a pair of chucks spaced apart to grip a pipe near opposite ends thereof, each of said chucks being constructed to open laterally to receive or discharge a pipe, mechanism for rotating said chucks in unison, tools for acting on the pipe while it is rotated by said chucks, operating mechanism for said tools, and means for automatically delivering pipes one at a time to said chucks.

13. In a machine of the character described, the combination of a pair of chucks spaced apart to grip a pipe near opposite ends thereof, each of said chucks being constructed to open laterally to receive or discharge a pipe, mechanism for rotating said chucks in unison, tools for acting on the pipe while it is rotated by said chucks, operating mechanism for said tools, and means for automatically ejecting the pipes from the chucks.

14. In a machine of the character described, the combination of a pair of chucks spaced apart to grip a pipe near opposite ends thereof, each of said chucks being constructed to open laterally to receive or discharge a pipe, mechanism for rotating said chucks in unison, tools for acting on the pipe while it is rotated by said chucks, operating mechanism for said tools, means for automatically delivering pipes one at a time to said chucks, and means for automatically ejecting the pipes from the chucks.

15. In a machine of the character described, a work holding mechanism comprising a rotary chuck constructed to grip the work, said chuck being split axially into a plurality of sections, and means for relatively moving the chuck sections to open the chuck laterally for the reception or removal of the work.

16. In a machine of the character described, a work holding mechanism comprising a rotary chuck split axially into a plurality of sections, a bearing supporting said chuck for rotation, said bearing being split axially, mechanism for rotating said chuck, and means for relatively moving the sections of said chuck and bearing to open the chuck to receive the work and to close it again to grip the work.

17. In a machine of the character described, a work holding mechanism comprising a rotary chuck split axially into a plurality of sections, a bearing supporting said chuck for rotation, said bearing being split axially, mechanism for rotating said chuck, means for relatively moving the sections of said chuck and bearing to open the chuck to receive the work and to close it again to grip the work, and means for retaining the sections of said chuck in substantially fixed relationship to their respective bearing members while the sections of the bearing are relatively moved to open or close the chuck.

18. In a machine of the character described, the combination of a chuck constructed to open laterally to receive or discharge the work, mechanism for rotating said chuck, and means for opening and closing the chuck, said chuck having jaws cooperating to grip the work.

19. In a machine of the character described, a work holding mechanism comprising a rotary chuck, said chuck being split axially into a plurality of sections, a support for said chuck, said support being split axially, means for relatively moving the sections of said chuck and support to open and close the chuck, and means for driving said chuck comprising a split gear secured fast to the chuck.

20. In a machine of the character described, a work holding mechanism comprising a rotary chuck split axially, supporting means for said chuck comprising a split bearing, the parts of said bearing being relatively slidable to open or close the chuck, and means for retaining the sections of said chuck in cooperative relationship to their respective bearing members during the opening and closing movements of the chuck.

21. In a machine of the character described, a work holding mechanism comprising a rotary chuck split axially into a plurality of sections, a bearing supporting said chuck for rotation, said bearing being split axially whereby the bearing and chuck may be opened laterally to receive or discharge the work, and means including a toggle mechanism for relatively moving the sections of said bearing and chuck, said toggle mechanism being operative to hold the chuck in its closed condition.

22. In a machine of the character described, a work holding mechanism comprising a rotary chuck split axially into a plurality of sections, a bearing supporting said chuck for rotation, said bearing being split axially, mechanism for rotating said chuck, and pneumatic means for relatively moving the sections of said chuck and bearing to open the chuck to receive the work and to close it again to grip the work.

23. In a machine of the character described, a work holding mechanism comprising a rotary chuck split axially into a plurality of sections, a bearing supporting said chuck for rotation, said bearing being split axially, mechanism for rotating said chuck, means for relatively moving the sections of said chuck and bearing to open the chuck to receive the work and to close it again to grip the work, and means for ensuring the proper registry of the sections of the bearing when they are moved to close the chuck.

24. In a machine of the character described, a work holding mechanism comprising a rotary chuck, said chuck being split axially into a plurality of sections, a bearing supporting said chuck for rotation and split similarly to said chuck, said chuck having flanged ends with turned back portions to embrace parts of the bearing, whereby the sections of the chuck are held in cooperative relationship to their respective bearing members when the chuck is opened.

25. In a machine of the character described, a work holding mechanism comprising a rotary chuck, said chuck being split axially into a plurality of sections, a bearing supporting said chuck for rotation and split similarly to said chuck, said chuck including an annular enlargement located between its end and said bearing having a recess to receive said enlargement.

26. In a machine of the character described, a work holding mechanism comprising a rotary chuck, said chuck being split axially into a plurality of sections, a bearing supporting said chuck for rotation and split similarly to said chuck, said chuck including a plurality of work supporting jaws adjustably mounted therein, one at least of said jaws being yieldingly supported, and means for relatively moving the sections of said bearing and chuck to open the chuck laterally to receive or discharge the work.

27. In a machine of the character described, a work holding mechanism comprising a rotary chuck, said chuck being split axially into a plurality of sections, a bearing supporting said chuck for rotation and split similarly to said chuck, means for relatively moving the section of said bearing and chuck to open or close the chuck, a part for engaging one of said chuck sections to hold it in a definite relationship to its cooperating bearing section while the chuck is open, and means for automatically operating said part to move it into its holding position when the chuck is open and to return it to its inoperative position again when the chuck is closed.

28. In a machine of the character described, a work holding mechanism comprising a chuck split axially into two sections, a bearing supporting said chuck for rotary movement and comprising a relatively fixed bearing member and a bearing bracket slidable on said member, said bracket and member cooperating to form a split bearing for said chuck, mechanism for moving said slidable bracket into position to open the chuck laterally, a dog carried by said bracket, and means for operating said dog to cause it to engage the chuck section carried thereby and hold said section in a definite relationship to said bracket when the chuck is open and to release said section when the chuck is closed again.

29. In a machine of the character described, the combination of a chuck constructed to open laterally to receive or discharge the work, mechanism for rotating said chuck, means for opening and closing the chuck, and power driven mechanism for introducing the work laterally into the chuck.

30. In a machine of the character described, the combination of a chuck constructed to open laterally to receive or discharge the work, mechanism for rotating said chuck, means for opening and closing the chuck, and means for automatically ejecting the work laterally from the chuck when the chuck is open.

31. In a machine of the character described, the combination of a chuck constructed to open laterally to receive or discharge the work, mechanism for rotating said chuck, means for opening and closing the chuck, and means arranged to be operated by the chuck operating mechanism for moving the work into and out of the chuck.

32. In a machine of the character described, the combination of a chuck constructed to open laterally to receive or discharge the work, mechanism for rotating said chuck, means for opening and closing the chuck, a slide arranged to engage the work and movable to carry it laterally into and out of the chuck, and connections between said slide and the chuck operating mechanism for operating the slide.

33. In a machine of the character described, the combination of a chuck constructed to open laterally to receive or discharge the work, mechanism for rotating said chuck, means for opening and closing the chuck, a slide arranged to engage the work and movable to carry it laterally into and out of the chuck, and mechanism for operating said slide in timed relationship to the opening and closing movements of the chuck.

34. In a machine of the character described, the combination of means for operating on a pipe, mechanism for holding the pipe for the operation thereon of said means, means for guiding a series of pipes toward said mechanism on a different level from that of said mechanism, an elevator for carrying the pipes to the level of said mechanism, and separating means for controlling the delivery of the pipes from said guiding means to said elevator.

35. In a machine of the character described, the combination of means for operating on a pipe, mechanism for holding the pipe for the operation thereon of said means, means for guiding a series of pipes toward said mechanism on a different level from that of said mechanism, an elevator for carrying the pipes to the level of said mechanism and means for moving the pipes laterally from the elevator into said pipe holding mechanism.

36. In a machine of the character described, the combination of means for operating on a pipe, mechanism for holding the pipe for the operation thereon of said means, means for guiding a series of pipes toward said mechanism on a different level from that of said mechanism, an elevator for carrying the pipes to the level of said mechanism, said elevator having an upper inclined face on which the pipes rest, and guiding means for preventing the pipes from rolling off said inclined face during a portion of the stroke of the elevator.

37. In a machine of the character described, the combination of means for operating on a pipe, mechanism for holding the pipe for the operation thereon of said means, and mechanism for carrying the pipes into said means and ejecting them therefrom comprising an elevator and a carrier for moving the pipes from said elevator to said holding mechanism and vice versa.

38. In a machine of the character described, the combination of means for operating on a pipe, mechanism for holding the pipe for the operation thereon of said means, inclined supports along which a series of said pipes can roll toward said mechanism, and means for controlling the delivery of said pipes to said mechanism comprising a plurality of stops spaced apart to receive a pipe between them, and mechanism for moving said stops in opposite directions to bring them alternately into their operative positions.

39. In a machine of the character described, the combination of means for operating on a pipe, mechanism for holding the pipe for the operation thereon of said means, inclined supports along which a series of said pipes can roll toward said mechanism on a different level from said mechanism, an elevator for carrying the foremost of said pipes to the level of said mechanism, stops for controlling the delivery of said pipes to said elevator, mechanism for operating said elevator, and connections whereby said elevator operates said stops.

40. In a machine of the character described, the combination of means for operating on a pipe, mechanism for holding the pipe for the operation thereon of said means, an elevator, and a carrier for transferring a pipe laterally between said mechanism and said elevator.

41. In a machine of the character described, the combination of means for operating on a pipe, mechanism for holding the pipe for the operation thereon of said means, an elevator having an inclined upper surface, a carrier for transferring a pipe laterally from said mechanism to said elevator, and inclined supports to which the pipe is delivered by said elevator.

42. In a machine of the character described, the combination of means for operating on a pipe, mechanism for holding the pipe for the operation thereon of said means, means for delivering a pipe to said mechanism comprising duplicate units spaced apart to engage the pipe at spaced points, and a common operating mechanism for said units.

43. In a machine of the character described, the combination of means for operating on a pipe, mechanism for holding the pipe for the operation thereon of said means, means for ejecting a pipe from said mechanism comprising duplicate units arranged to engage the pipe at spaced points, and a common operating mechanism for said units.

44. In a machine of the character described, the combination of a pair of chucks spaced apart and adapted to grip a pipe near the opposite ends thereof, each of said chucks being constructed to open laterally to receive or discharge a pipe, mechanism for supporting and rotating said chucks, means for opening and closing the chucks, carrying mechanism for moving a pipe laterally into and out of said chucks while they are open, and means for delivering pipes one at a time to said carrying mechanism.

45. In a machine of the character described, the combination of a pair of chucks spaced apart and adapted to grip a pipe near the opposite ends thereof, each of said chucks being constructed to open laterally to receive or discharge a pipe, mechanism for supporting and rotating said chucks, means for opening and closing the chucks, an elevator for the pipes, and carrying mechanism for transferring the pipes laterally between the elevator and said chucks.

46. In a machine of the character described, the combination of means for operating on a pipe, mechanism for holding the pipe for the operation thereon of said means, inclined supports along which a series of pipes can roll toward said mechanism on a different level from said mechanism, and automatic means for effecting the delivery of said pipes one at a time from said supports to said holding mechanism.

47. In a machine of the character described, the combination of tools for acting simultaneously on opposite ends of a length of pipe, means for holding a length of pipe while said tools operate on it, mechanism for relatively rotating said means and tools about the axis of the pipe to effect the desired operation on the pipe, and automatic means for presenting lengths of pipe one at a time to said holding means.

48. In a machine of the character described, the combination of tools for acting simultaneously on opposite ends of a length of pipe, means for holding a length of pipe while said tools operate on its, mechanism for relatively rotating said means and tools about the axis of the pipe to effect the desired operation on the pipe, and automatic mechanism for ejecting the pipe from said holding means.

49. In a machine of the character described, the combination of a pair of chucks spaced apart and operative to grip a pipe near opposite ends thereof, mechanism for opening and closing said chucks to cause them to grip or release the pipe, automatic mechanism for delivering a pipe to said chucks, and tools for acting on the pipe while it is supported by the chucks.

50. In a machine of the character described, the combination of a pair of chucks spaced apart and operative to grip a pipe near opposite ends thereof, mechanism for opening and closing said chucks to cause them to grip or release the pipe, mechanism for supporting and rotating said chucks, tools for acting on said pipe while it is supported by the chucks, and mechanism for automatically ejecting the pipe from said chucks.

51. In a machine of the character described, the combination of a pair of chucks spaced apart and adapted to grip a pipe near the opposite ends thereof, each of said chucks being constructed to open laterally to receive or discharge a pipe, mechanism for supporting and rotating said chucks, means for opening and closing the chucks, and mechanism including an elevator for moving a pipe into or out of the chucks while they are open.

52. In a machine of the character described, the combination of a pair of chucks spaced apart and adapted to grip a pipe near the opposite ends thereof, each of said chucks being constructed to open laterally to receive or discharge a pipe, mechanism for introducing pipes one at a time into said chucks and for ejecting them from the chucks, and means operative automatically upon the ejection of a pipe to effect the positioning of another pipe in readiness for delivery to the chucks.

53. In a machine of the character described, the combination of a pair of chucks spaced apart and adapted to grip a pipe near the opposite ends thereof, each of said chucks being constructed to open laterally to receive or discharge a pipe, mechanism for introducing pipes one at a time into said chucks and for ejecting them from the chucks, an inclined guideway along which pipes may roll toward said chucks, the chucks being located below the level of said guideway, and mechanism including an elevator for transferring pipes one at a time between said guideway and said chucks.

54. In a machine of the character described, the combination of a pair of chucks spaced apart and adapted to grip a pipe near the opposite ends thereof, each of said chucks being constructed to open laterally to receive or discharge a pipe, tools for operating on the opposite end portions of a pipe while it is held in said chucks, mechanism for relatively rotating said chucks and tools about the axis of the pipe, means for opening and closing the chucks, a guideway along which the pipes can roll toward said chucks, said chucks being located below the level of said guideway, mechanism including an elevator for transferring pipes one at a time from said guideway to said chucks, operating mechanism for said elevator, and an automatic separating mechanism for controlling the delivery of the pipes from said guideway to said elevator.

55. In a machine of the character described, the combination of a pair of chucks spaced apart and adapted to grip a pipe near the opposite ends thereof, each of said chucks being constructed to open laterally to receive or discharge a pipe, an inclined guideway along which pipes may roll toward said chucks, the chucks being located below the level of said guideway, and mechanism including an elevator for transferring pipes one at a time between said guideway and said chucks.

56. In a machine for operating on pipe, the combination of a chuck constructed to open laterally to receive or discharge a length of pipe, said chuck having a plurality of jaws to grip the pipe and one of said jaws being spring pressed against the pipe while it is in the chuck, mechanism for rotating said chuck, and means for opening and closing the chuck.

ERIK W. MIKAELSON.

Certificate of Correction.

It is hereby certified that in Letters Patent No. 1,574,048, granted February 23, 1926, upon the application of Erik W. Mikaelson, of Easton, Pennsylvania, for an improvement in "Pipe-Cutting Machines," errors appear in the printed specification requiring correction as follows: Page 3, line 118, for the word "motor" read *motors;* page 5, line 124, claim 9, for the word "or" read *off;* page 7, line 58, claim 27, for the word "section" read *sections;* page 9, line 21, claim 48, for the word "its" read *it;* and that the said Letters Patent should be read with these corrections therein that the same may conform to the record of the case in the Patent Office.

Signed and sealed this 30th day of March, A. D. 1926.

[SEAL.]

M. J. MOORE,
*Acting Commissioner of Patents.*